April 7, 1925.　　　　　　　　　　　　　　1,532,775
J. W. PAGE
EXCAVATING SHOVEL
Filed April 24, 1922　　　2 Sheets-Sheet 1
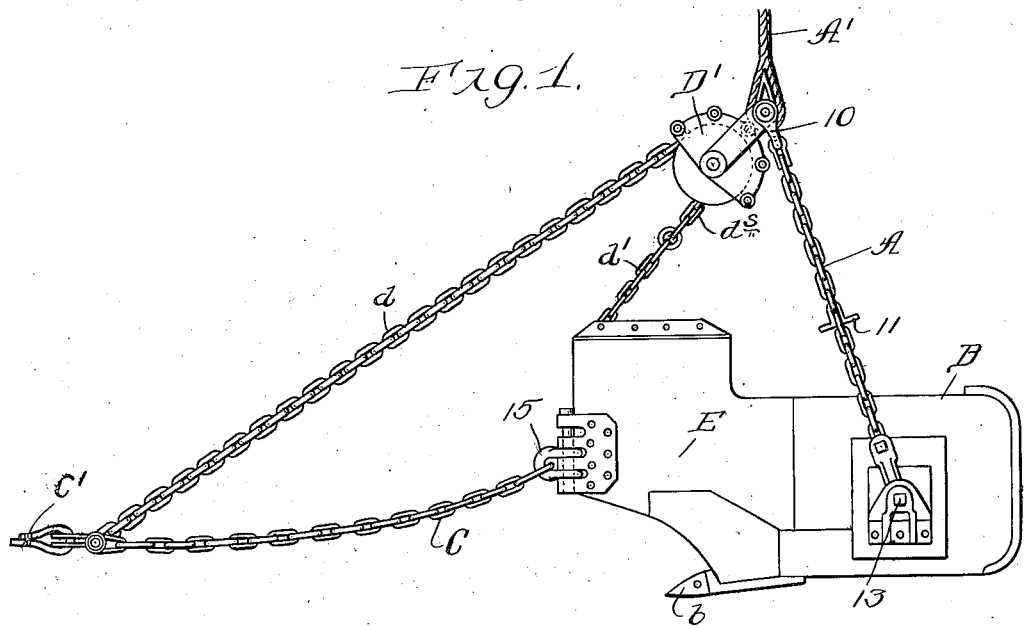
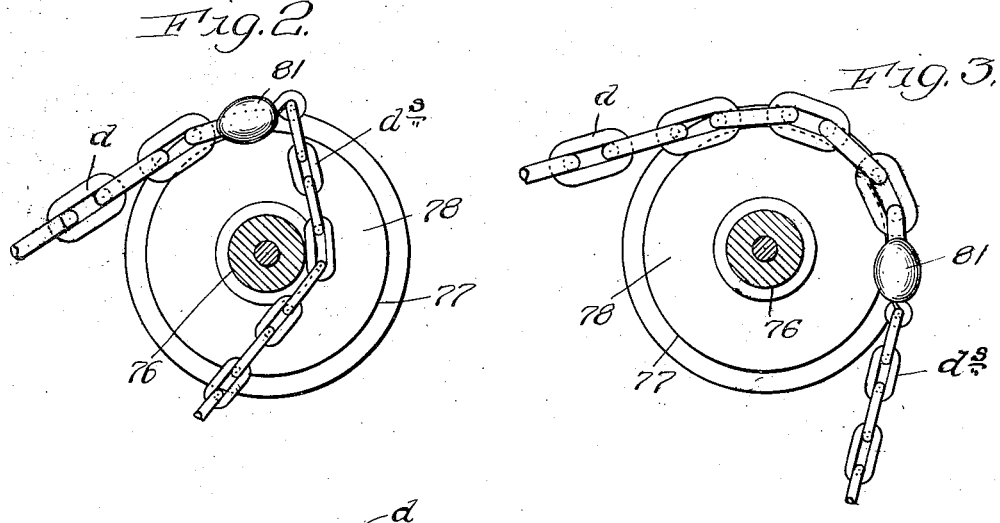
Inventor,
John W. Page,

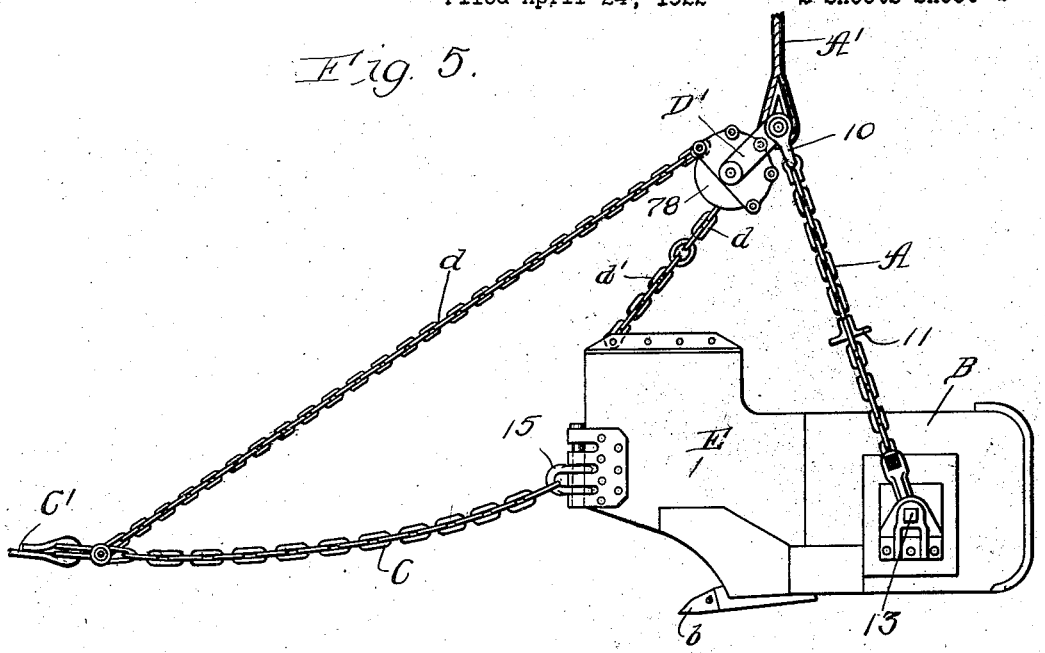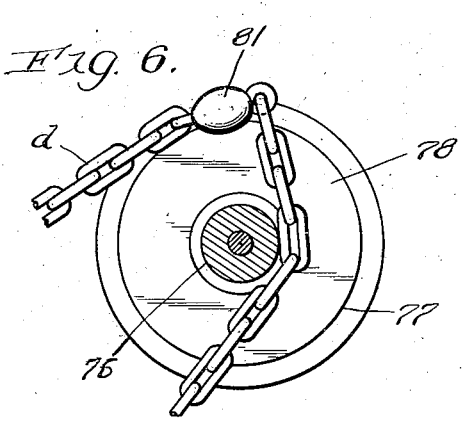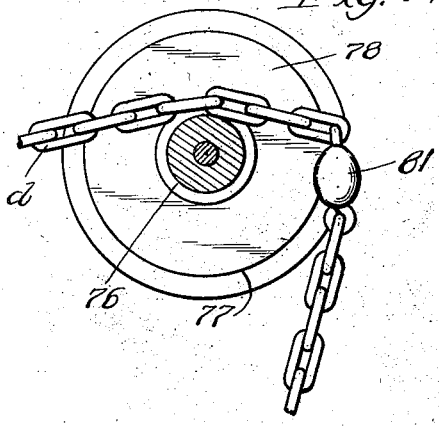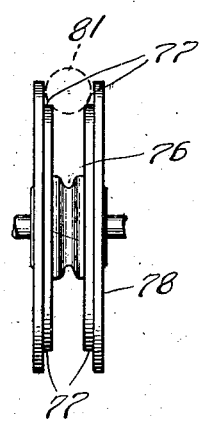

Patented Apr. 7, 1925.

1,532,775

UNITED STATES PATENT OFFICE.

JOHN W. PAGE, OF CHICAGO, ILLINOIS.

EXCAVATING SHOVEL.

Application filed April 24, 1922. Serial No. 556,168.

*To all whom it may concern:*

Be it known that I, JOHN W. PAGE, a citizen of the United States, residing at Chicago, in the county of Cook and State of Illinois, have invented a new and useful Improvement in Excavating Shovels, of which the following is a specification.

This invention relates to improvements in excavating shovels and is fully described and explained in this specification and shown in the accompanying drawings, in which—

Figure 1 is a side view of my improved shovel, Fig. 2 is a vertical sectional view of the block forming a part of the device, Fig. 3 is a view similar to Fig. 2 showing the chain in a different position on the block, Fig. 4 is a view in front elevation of the sheave of a block forming a part of the device, Fig. 5 is a view in side elevation showing a modified form of device, Fig. 6 is a vertical sectional view of the block forming a part of such modified form, Fig. 7 is a view similar to Fig. 6 showing the parts in different positions, and Fig. 8 is a view in front elevation of the sheave of the block.

The excavating shovel herein shown is of the same general type as, and an improvement on, the shovels shown in my Patent No. 758,380 dated April 26, 1904, my Patent No. 916,772 dated March 30, 1909, and my copending patent application Serial No. 480,007 filed June 24, 1921. The particular features of difference between this shovel and the shovels shown in said patents and copending application will be particularly pointed out herein.

Referring to the drawings, A indicates chains pivotally attached to the sides of the shovel at their lower ends, and having their upper ends fastened to a clevis 10, for the attachment of a cable A' by which the shovel can be lifted. The chains A are separated by a spreader-bar 11, above the shovel to form a sort of bail.

B indicates the shovel proper which is pivotally secured to the lower ends of the chains A, the points of connection between the chains A and the shovel being behind the center of gravity of the shovel, so when released the shovel will swing down and dump its contents as is particularly set forth in Patent No. 758,380 granted April 26, 1904, referred to above. Pivotal connections between the lower ends of the chains A and the shovel are indicated by 13. The front lower corner of the shovel is provided with a cutting-edge indicated by $b$. The sides of the shovel, as indicated by E, project slightly forward of the cutting-edge $b$. To the front edges of the sides E are fastened eyes 15, to which are attached the chains C which perform the same function as the two small hauling-ropes C of my Patent No. 758,380, and the same function as the hauling-bail C of my Patent No. 916,772. The hauling chains C are connected at their forward ends to the hauling-rope C'.

The block D' is attached to the lower end of the lifting cable A', where it is fastened to the clevis 10. Over this block runs a holding-chain $d$, $d^s$, one end of which is secured to the ends of two short holding-chains $d'$ which are secured to the upper forward corners of the sides E of the shovel. The other end of the holding-chain $d$, $d^s$ is fastened to the point of attachment of the hauling-chain C to the main hauling-rope C'. This shovel differs from the shovels shown in the patents and copending application referred to, in the construction, arrangement and operation of the block D' and holding-chain $d$, $d^s$ passing over the same. These parts will be described more in detail hereinafter.

In general my shovel works the same as the shovel of patents and copending application referred to, each one of the parts doing all that is done by the corresponding parts of the shovels of said patents and application. Thus, when it is desired to excavate with my shovel, the hauling-rope C' can be drawn in by a suitable engine, and the shovel will fill itself with earth in the ordinary way. Thereupon the shovel can be raised by a derrick, if desired, and it will be maintained in a horizontal position as long as tension is maintained on the hauling-rope C'. As the shovel is lifted it is held in horizontal position as long as the main hauling-rope C' is held taut, the force for holding the shovel horizontal passing to it at times through the short hauling-chains C, at other times through the holding-chain $d$, $d^s$ and at times through both. The holding-chain $d$, $d^s$ keeps the shovel in a horizontal position only when it is kept under tension by the tautness of the hauling-rope C'. As soon as tension on the hauling rope C' is released, therefore, regardless of the elevation of the shovel, both means for holding the shovel in a horizontal position are released and its own weight swings it down so as to dump its contents.

It will be noted that when the shovel is to be held in a horizontal position by the holding-chain $d$, $d^s$, said holding-chain must be kept under tension by the tautness of the hauling-rope C'. It is desirable to maintain the requisite tension on the holding-chain $d$, $d^s$ to keep the shovel horizontal, without unnecessary tautness of the hauling-rope C'; since too much tautness on said hauling-rope C' is likely to swing the shovel out of the desired position for dumping. For this reason, it is desirable to provide means whereby a slight tautness of the hauling-rope C' will maintain sufficient tension on the holding-chain $d$, $d^s$ to keep the shovel in a horizontal position until it is ready to be dumped. However, in order to permit quick, free and complete dumping of the shovel, the holding-chain $d$, $d^s$ should be permitted to run over the block D' freely as soon as the hauling-rope C' is released for dumping the shovel. In my improved shovel these features are accomplished. When the shovel is in a horizontal position, a slight tautness on the hauling-rope C' serves to maintain sufficient tension on the holding-chain $d$, $d^s$ to keep the shovel from dumping. As soon as this tautness is released, however, the holding-chain $d$, $d^s$ runs freely over the block D', permitting the shovel to dump completely and thoroughly. I will now describe in detail the construction, arrangement and operation of the parts by which these features are accomplished.

The block D' is provided with a double-grooved sheave showing it removed and from the block in Figs. 2, 3 and 4. The two grooves of this sheave are concentrically arranged, one being larger than the other. I have indicated the smaller groove by 76, and the larger groove by 77. The larger groove is formed by the flanged disks 78 forming the sides of the sheave. The holding-chain $d$, $d^s$ carries at one point an egg-shaped piece of metal 81, large enough so that it will not pass between the disks 78, but will run up on the larger groove 77 at the periphery of the disks 78. The holding-chain $d$, $d^s$ is made of two different sizes. That part of the chain, indicated by $d$, between the ball 81 and the end attached to the hauling-rope C', is large enough so that it will not pass between the disks 78, but will run up on the larger groove 77. That part of the holding-chain, indicated by $d^s$, between the ball 81 and the end attached to the two short holding-chains $d'$, is small enough so that it will pass between the disks 78 and run on the smaller groove 76 of the block. The ball 81, separating the large and small parts of the holding-chain, $d$ and $d^s$ respectively, is so placed that when the shovel is in a horizontal position it will be located on the sheave approximately in the position shown in Fig. 2. When in this position, it will be noted that the larger part $d$ of the holding-chain between the block D' and the hauling-rope C' will be on the larger groove of the sheave, while the smaller part $d^s$ of the holding-chain between the block D' and the forward ends of the shovel will be on the smaller groove of the sheave. This will give a leverage in favor of the end of the holding-chain attached to the end of the hauling-rope C', so that but a slight tautness on said hauling-rope C' will serve to maintain sufficient tension on the holding-chain to prevent dumping of the shovel. As soon as the tautness of the hauling-rope C' is released and the shovel commences to dump, the large part $d$ of the holding-chain will run over the large groove 77 of the block, as shown in Fig. 3, thus destroying the leverage referred to above, and permitting the holding-chain to run freely over the sheave to allow free and complete dumping of the shovel.

In Fig. 3, I have shown the position of the holding-chain with respect to the sheave, after the shovel has commenced to tip. It will be noted that the large part $d$ of the chain has run around the larger groove 77 of the sheave, thus destroying the leverage in favor of the hauling-rope C', that existed when the parts were in the position shown in Fig. 2.

In Figs. 5, 6, 7 and 8, I have shown a modified form of device. In this modified form, similar parts bear similar reference numerals. The only difference between the modified form and the preferred form is in the side of the holding-chain $d$ between the ball 81 and the end attached to the hauling-rope C'. In the preferred form, this part of the holding-chain $d$ is so large that it will run up on the large groove 77 of the block. In the modified form it is sufficiently small so that it will drop down onto the smaller groove 76 of the block. In this modified form the two parts of the holding-chain are of the same size. The ball, or egg-shaped enlargement, 81, however, is large enough so that it will run up on the larger groove. In this modified form, therefore, as soon as the tautness of the hauling-rope C' is released and the shovel commences to dump, the enlargement 81 will run over the larger groove 77 of the sheave, permitting the holding-chain $d$ to drop down onto the smaller groove 76, thus destroying the leverage referred to above, and permitting free and complete dumping of the shovel. When the parts are in the position shown in Fig. 7, the leverage existing before in favor of the hauling-rope C' will not only be destroyed, but there will be a leverage existing in favor of the shovel.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. In a device of the class described, the combination with a suitable shovel, of supporting means pivoted thereto behind the center of gravity thereof, hauling means pivotally secured to the front of the shovel, a block with a double-grooved sheave attached to the supporting means, one of the grooves being larger than the other, and a holding-chain running from the front of said shovel over said sheave to the hauling means, that part of the holding-chain running over said sheave having its major portion adapted to run in the smaller groove of the double-grooved sheave and provided with an enlargement adapted to run up on the larger groove thereof.

2. A block provided with a sheave having two concentrically arranged grooves of different sizes, in combination with a chain the major portion of which is adapted to run in the smaller groove thereof and provided with an enlargement adapted to run up on the larger groove thereof.

3. A block provided with a sheave having two concentrically arranged grooves of different sizes, in combination with a chain adapted to run in the smaller groove thereof and provided with a ball intermediate its length adapted to run up on the larger groove thereof.

4. A block provided with a sheave having two concentrically arranged grooves of different sizes, in combination with a chain adapted to run over said sheave, said chain having an enlargement adapted to run up on the larger groove of the sheave and a portion of smaller diameter on each side of said enlargement adapted to run in the smaller groove of said sheave.

Witness my hand and seal this 21 day of April, 1922.

JOHN W. PAGE. [L. S.]